United States Patent [19]
Darland et al.

[11] Patent Number: 5,793,771
[45] Date of Patent: Aug. 11, 1998

[54] COMMUNICATION GATEWAY

[75] Inventors: Timothy E. Darland; Douglas P. Reiman; Robert F. Dickerman, all of Cedar Rapids, Iowa; Wayne M. Cartee, Ashburn, Va.; Donald Alan Turner, McKinney, Tex.

[73] Assignee: MCI Communications Corporation, Washington, D.C.

[21] Appl. No.: 672,139

[22] Filed: Jun. 27, 1996

[51] Int. Cl.[6] .................................. H04J 3/16; H04J 3/22
[52] U.S. Cl. ............................................... 370/467
[58] Field of Search ...................... 370/401, 402, 370/465, 466, 467, 524, 264; 379/229, 230

[56] References Cited

U.S. PATENT DOCUMENTS

| | | | |
|---|---|---|---|
| 5,208,811 | 5/1993 | Kashio et al. | 370/529 |
| 5,239,542 | 8/1993 | Breidenstein et al. | 379/94 |
| 5,638,431 | 6/1997 | Everett et al. | 379/115 |
| 5,640,446 | 6/1997 | Everett et al. | 379/115 |

*Primary Examiner*—Ajit Patel

[57] ABSTRACT

A system and method for protocol translation. The system includes an SS7 Module for sending and receiving a plurality of incoming and outcoming SS7 queries and response. The system also includes an Inbound Subsystem Module, coupled to the SS7 Module, for translating the incoming SS7 queries from a SS7 protocol to a non-SS7 protocol. The translated incoming queries are forwarded to an end user while in the non-SS7 protocol. The Inbound Subsystem Module also translates any responses corresponding to the incoming SS7 queries from the non-SS7 protocol to the SS7 protocol. The system further includes an Outbound Subsystem Module, coupled to the SS7 Module, for translating outgoing SS7 queries from the non-SS7 protocol to the SS7 protocol. The translated outgoing queries are sent via the SS7 module across an SS7 network. The Outbound Subsystem Module also translates SS7 responses corresponding to the outgoing SS7 queries from the SS7 protocol to the non-SS7 protocol. The translated responses corresponding to the outgoing SS7 queries are forwarded to an end user while in the non-SS7 protocol.

20 Claims, 13 Drawing Sheets

INVOKE COMPONENT — 530

| | |
|---|---|
| COMPONENT TYPE TAG | M |
| COMPONENT LENGTH | |
| INVOKE ID TAG | M |
| INVOKE ID LENGTH | |
| INVOKE ID | |
| LINKED ID TAG | O |
| LINKED ID LENGTH | |
| LINKED ID | |
| OPERATION CODE TAG | M |
| OPERATION CODE LENGTH | |
| OPERATION CODE | |
| PARAMETERS | O |

532, 533, 534, 535, 536, 538, 539, 540, 542, 543, 544, 546

RETURN RESULT (LAST) COMPONENT — 550

| | |
|---|---|
| COMPONENT TYPE TAG | M |
| COMPONENT LENGTH | |
| INVOKE ID TAG | M |
| INVOKE ID LENGTH | |
| INVOKE ID | |
| SEQUENCE TAG | O |
| SEQUENCE LENGTH | |
| OPERATION CODE TAG | O |
| OPERATION CODE LENGTH | |
| OPERATION CODE | |
| PARAMETERS | O |

532, 533, 534, 535, 536, 552, 553, 542, 543, 544, 546

RETURN ERROR COMPONENT — 560

| | |
|---|---|
| COMPONENT TYPE TAG | M |
| COMPONENT LENGTH | |
| INVOKE ID TAG | M |
| INVOKE ID LENGTH | |
| INVOKE ID | |
| ERROR CODE TAG | M |
| ERROR CODE LENGTH | |
| ERROR CODE | |
| PARAMETERS | O |

532, 533, 534, 535, 536, 562, 563, 564, 546

REJECT COMPONENT — 570

| | |
|---|---|
| COMPONENT TYPE TAG | M |
| COMPONENT LENGTH | |
| INVOKE ID TAG | M |
| INVOKE ID LENGTH | |
| INVOKE ID | |
| PROBLEM CODE TAG | M |
| PROBLEM CODE LENGTH | |
| PROBLEM CODE | |
| PARAMETERS | O |

532, 533, 534, 535, 536, 572, 573, 574, 546

COMMUNICATION GATEWAY

BACKGROUND OF THE INVENTION

1. Field of Invention

The present invention relates generally to the field of network communications, and more particularly, to a gateway for providing protocol translation between foreign and domestic telecommunication service providers.

2. Related Art

The Consultative Committee on International Telegraph and Telephone (CCITT) is the standards-setting committee of the International Telecommunications Union (ITU). The CCITT developed an internationally standardized general purpose common channel signaling system called Signaling System No. 7 (SS7). SS7 provides an industry standardized means for communicating with foreign Postal Telephone and Telegraph (PTT) networks. This includes, but is not limited to, a means for performing International Credit Card Number (ICCN) card validation for calls originated to/from a foreign PTT network as well as for calls originated to/from other national telecommunication service provider networks.

To communicate with a foreign PTT, the telecommunication service provider network must be compatible with the rules used by SS7. These rules are referred to as standards or protocols. Protocols determine where, when, how, and in what format information is transmitted. Communication between networks utilizing different protocols requires the implementation of an interface structure referred to as a protocol converter or a gateway. A protocol converter or a gateway provides protocol translation between dissimilar networks.

A conventional signaling interface infrastructure 100 is shown in FIG. 1. The conventional signaling interface infrastructure 100 is embodied, for example, on MCI's Intelligent Services Network (ISN) 102. ISN 102 is an operator services network that provides both automated and manual services to MCI customers and its associated business partners. The conventional signaling interface infrastructure 100 comprises a CCITT protocol converter (P/C) 104, an X.25 local area network (LAN) 106, and a validation gateway 108. The primary function of the signaling interface infrastructure 100 is to translate (or map) inbound SS7 queries from a foreign PTT 110 into a Network Information Distribution Service (NIDS) Sequenced Packet Protocol (NSPP) and send the data, via User Datagram Protocol-Internet Protocol (UDP-IP) to an Operator Network Center (ONC) 112. NSPP is a communications layer protocol that provides fast, reliable transport environments for client/server (118/120) communications.

The conventional signaling interface infrastructure 100 accepts an SS7 query from the foreign PTT 110 and converts that SS7 query into an X.25 message using the CCITT protocol converter (P/C) 104. The X.25 message is routed across the X.25 LAN 106 to the validation gateway 108. The validation gateway 108 converts the message from the X.25 format to NSPP and transports that data, via UDP-IP, to the Operator Network Center (ONC) 112. The 89 DB 114 is a database used for ICCN validation. The 89 is representative of the first two digits on the ICCN. The ONC 112 returns a NSPP response to the validation gateway 108 via UDP-IP. The validation gateway 108 converts the NSPP response to X.25 and routes the response to the CCITT P/C 104 via the X.25 LAN 106. The CCITT P/C 104 maps the response to SS7 and sends the response to the foreign PTT 110.

Functional capabilities of the CCITT P/C 104 include monitoring both the X.25 106 and SS7 (not explicitly shown) networks and providing alarms to inform of certain events and/or errors within the system. The CCITT P/C 104 also monitors the time that it takes to respond to a query.

The conventional interface infrastructure 100 requires two protocol translations, one protocol translation between SS7 and X.25 (between devices 104 and 106) and a second protocol translation between X.25 and NSPP (between devices 108 and 112, 116). Response mapping performed by the CCITT P/C 104 is a single table allowing for communication with a single PTT. Thus, the conventional interface infrastructure 100 does not allow communication with multiple foreign PTTs. Only inbound queries are processed on the conventional interface infrastructure 100. The conventional interface infrastructure 100 is not equipped to perform outbound queries. Thus, the capability of validating other telecommunication service provider ICCN cards, among other things, does not exist.

SUMMARY OF THE INVENTION

The present invention is directed toward a gateway within a telecommunication network environment for providing protocol translation between CCITT SS7 (a connectionless protocol) and a connection oriented protocol, such as, but not limited to, NSPP and TCP. The present invention is a robust infrastructure that eliminates the need for double protocol conversion by eliminating the conversion between X.25 and SS7.

The present invention, referred to as a Communication Gateway (Communication G/W), offers both inbound and outbound validation services. For inbound service, the Communication G/W translates an SS7 query into a connection oriented non-SS7 protocol (hereinafter referred to as a non-SS7 protocol), such as NSPP and TCP, and returns a response that translates from the non-SS7 protocol to SS7. For outbound service, the present invention works in reverse. A non-SS7 query is translated into SS7 and an SS7 return response is translated to a non-SS7 protocol.

The Communication G/W comprises four modules. The first module is a SS7 Module. The SS7 Module manages multiple signaling links over which it sends and receives outgoing and incoming SS7 queries and responses. The next two modules are the Inbound Subsystem Module and the Outbound Subsystem Module. The Inbound Subsystem Module handles all inbound services and the Outbound Subsystem Module handles all outbound services. The last module is a Network Interface Module (NIM). NIM provides all functionality required to implement both client and server operations of the non-SS7 protocol, as well as provide IP based routing.

For inbound service, the SS7 Module receives an SS7 query, strips off the Message Transfer Part (MTP) and the Signaling Connection Control Part (SCCP), and decodes (parses) the transaction portion of the Transaction Capabilities Application Part (TCAP). The MTP and the SCCP are components of the SS7 protocol and are well known to persons skilled in the relevant art(s). Once the message is successfully parsed, the component portion of the TCAP message is passed directly to the Inbound Subsystem Module. The Inbound Subsystem Module decodes the component portion of the TCAP message. Errors found in the format of the TCAP message result in a Reject or Return Error message being returned to the message originator. Once the TCAP parameters are successfully parsed, the parameters are translated into the required format for database servers, such as Network Information Distributed Service (NIDS) database servers. A non-SS7 protocol packet is formatted and the packet is delivered to the Network Interface Module. NIM routes the message to the telecommunication service provider via UDP-IP. The telecommunication service provider returns a non-SS7 response via UDP-IP to NIM. NIM delivers the response to the Inbound Subsystem Module. The Inbound Subsystem builds the TCAP component portion and passes the TCAP component portion to the SS7 Module. The SS7 Module adds the transaction portion of the TCAP functionality as well as the SCCP and MTP functionality and sends the response out SS7.

For outbound service, the Communication G/W operates in reverse with one exception, the queries and responses traverse the Outbound Subsystem Module instead of the Inbound Subsystem Module. NIM receives a non-SS7 query via UDP-IP and delivers the query to the Outbound Subsystem Module. The Outbound Subsystem Module converts the non-SS7 query to a TCAP message by building the component portion of the TCAP message. The component portion of the TCAP message is sent to the SS7 Module. The SS7 Module completes the SS7 formatting by adding the transaction portion of the TCAP message as well as the SCCP and MTP components to the component portion of the TCAP message and routes the message out of the Communication G/W to the designated service provider network. When a response is sent back, the response traverses the same path until it reaches the console.

Overall management of the Communication G/W is performed using a Basic Overseer Service (BOSS). BOSS monitors all processes on the Communication G/W and keeps track of these processes by invoking policies for deciding which process will be activated under the gateway environment through the initialization and de-initialization of the process. If a process has abnormally terminated, BOSS will restart the process. BOSS also reports the status of each process performed on the Communication G/W to a Communication G/W user interface or Human Machine Interface (HMI), such as a console, a personal computer, or a workstation.

Other features of the Communication G/W include monitoring means to monitor the Communication G/W and provide alarms indicating, but not limited to, link failures, linkset failures, excessive SCCP errors, excessive TCAP errors and time outs. The Communication G/W monitors the time that it takes to receive a response for a query sent to a foreign PTT and the time it takes to receive a response for a query sent to the telecommunication service provider. When the threshold response time is exceeded for either the outbound or inbound query, an alarm is generated. Incoming and outgoing calls of the Communication G/W are also measured. The Communication G/W also allows for customized response code assignment on a per PTT basis to meet the business needs of each foreign PTT. This is accomplished with the implementation of table driven response code mapping.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWING

The present invention will be described with reference to the accompanying drawings wherein:

FIGS. 5a and 5b illustrate the structure of a Transaction Capabilities Application Part (TCAP) message;

DETAILED DESCRIPTION OF THE INVENTION

The preferred embodiment of the present invention is discussed in detail below. While specific configurations are discussed, it should be understood that this is done for illustration purposes only. A person skilled in the relevant art will recognize that other components and configurations may be used without parting from the spirit and scope of the invention.

The present invention provides a means of communication between a foreign PTT and a communication service provider utilizing the CCITT common channel signaling system called SS7. The present invention provides protocol translation (or mapping) between the CCITT SS7 protocol and a non-SS7 protocol, such as MCI's proprietary protocol, Network Information Distribution Service (NIDS) Sequenced Packet Protocol (NSPP). NSPP is a communications layer protocol that provides a fast and reliable transport environment for client/server communications.

Although the present invention is described in terms of an ISN for ICCN card validation, the present invention is not limited to this environment, nor is it limited to this particular use. The present invention is applicable to other environments utilizing the CCITT standard SS7 protocol. Existing services utilizing the present invention may include, for example, validation service, database service, switch service, and audio service.

Figure 1:
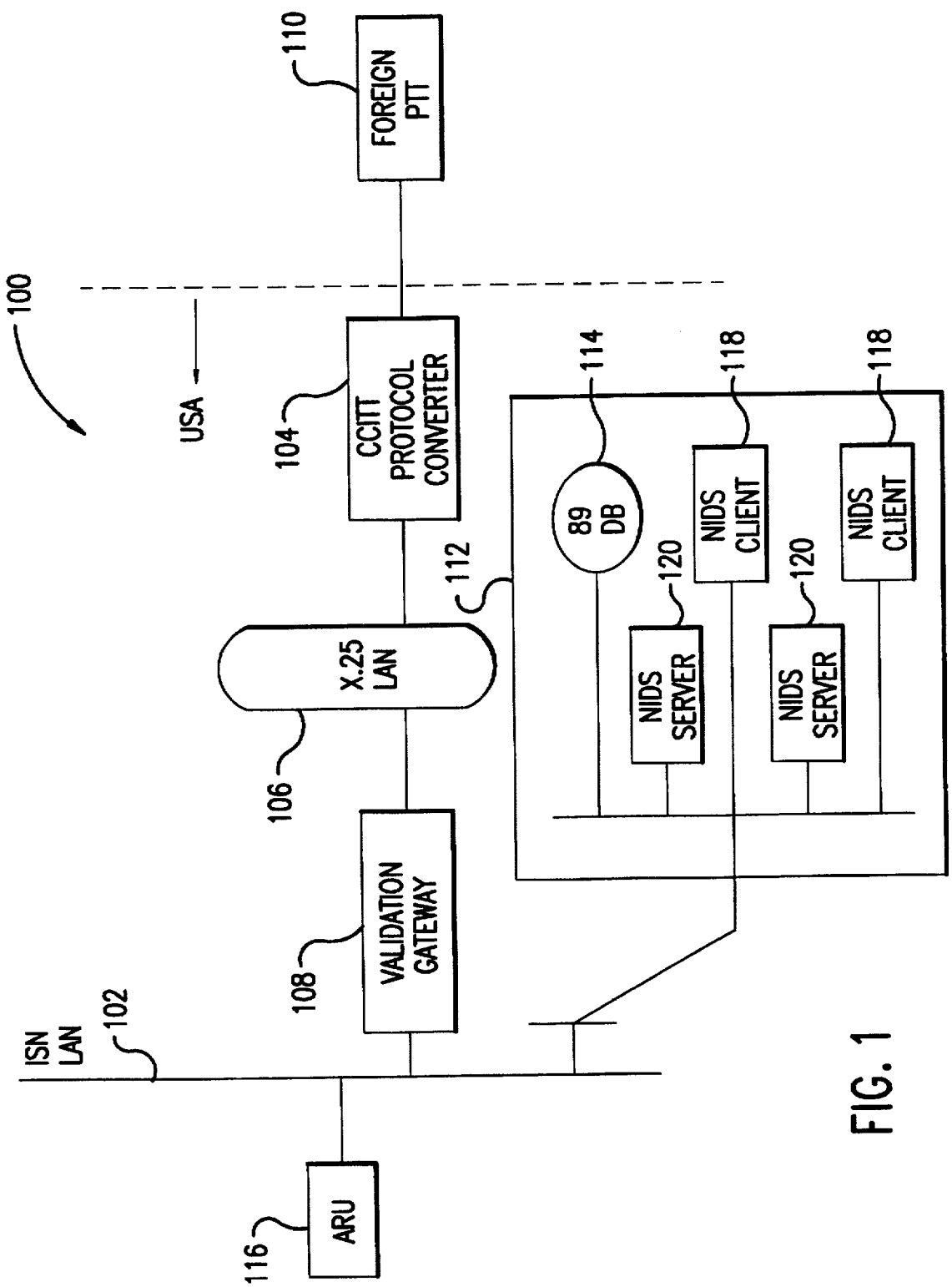
FIG. 1 illustrates a conventional ICCN signaling interface infrastructure.
Figure 2:
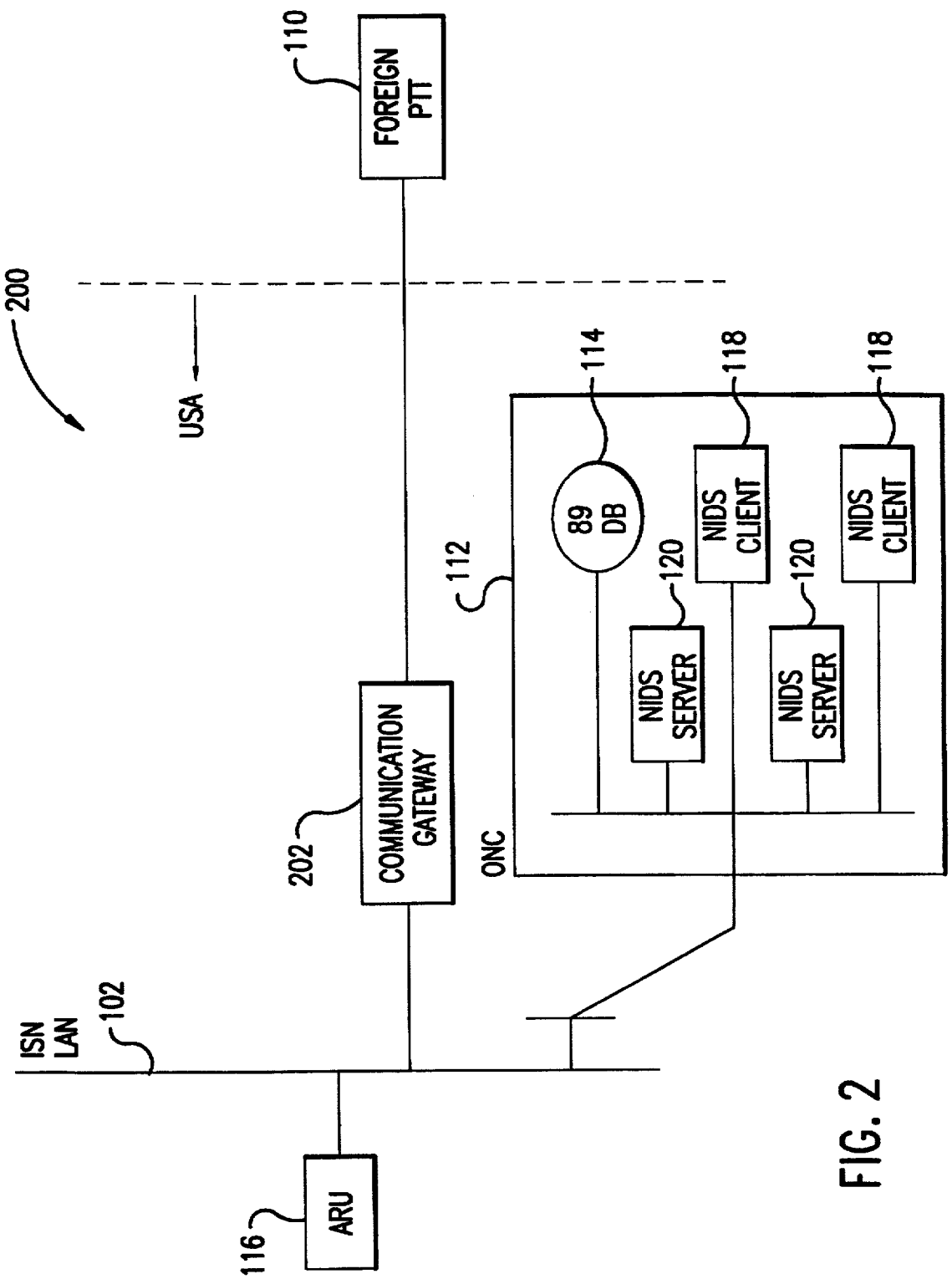
FIG. 2 illustrates the Communication Gateway embodied on the Intelligent Service Network.

An embodiment of the present invention is shown in FIG. 2. The implementation of the Communication G/W 202 on the ISN 102 eliminates the double protocol conversion discussed in the conventional interface infrastructure 100 of FIG. 1. The present invention offers both inbound and outbound validation services. The Communication G/W 202 accepts as input an SS7 query from a foreign PTT 110 for validation of a service provider ICCN card. The Communication G(W 202 maps the 557 query to a non-SS7 protocol message and sends it to an ISN 89 Card Database 114 via UDP-IP for ICCN service validation. In a similar manner, the Communication G/W 202 accepts as input a non-SS7 protocol query from the ONC 112 via UDP-IP, maps it to an SS7 message and sends it to the foreign PTT 110 for ICCN validation of other service provider ICCN cards.

Figure 3:
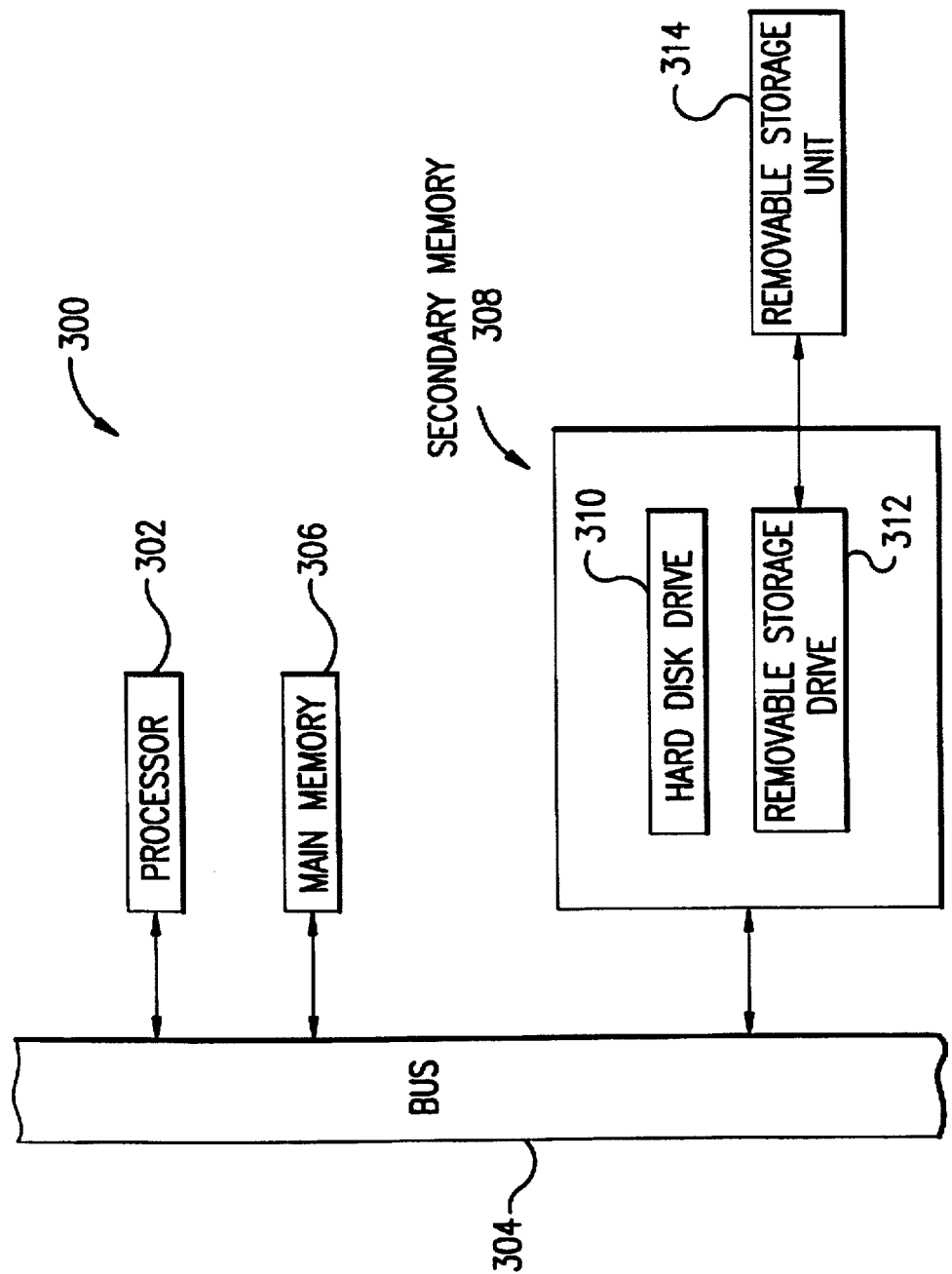
FIG. 3 illustrates an exemplary computer system.

In one embodiment, the invention is directed to a computer system operating as the Communication G/W 202 discussed herein. An exemplary computer system 300 is shown in FIG. 3. The computer system 300 includes one or more processors, such as processor 302. The processor 302 is connected to a communication bus 304.

The Computer system 300 also includes a main memory 306, preferably random access memory (RAM), and a secondary memory 308. The secondary memory 308 includes, for example, a hard disk drive 310 and/or a removable storage drive 312, representing a floppy disk drive, a magnetic tape drive, a compact disk drive, etc. The removable storage drive 312 reads from and/or writes to a removable storage unit 314 in a well known manner.

Removable storage unit 314, also called a program storage device or a computer program product, represents a floppy disk, magnetic tape, compact disk, etc. The removable storage unit 314 includes a computer usable storage medium having stored therein computer software and/or data.

Computer programs (also called computer control logic) are stored in main memory and/or the secondary memory 308. Such computer programs, when executed, enable the computer system 300 to perform the features of the present invention as discussed herein. In particular, the computer programs, when executed, enable the processor 302 to perform the features of the present invention. Accordingly, such computer programs represent controllers of the computer system 300.

In another embodiment, the invention is directed to a computer program product comprising a computer readable medium having control logic (computer software) stored therein. The control logic, when executed by the processor 302, causes the processor 302 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art.

Figure 4:
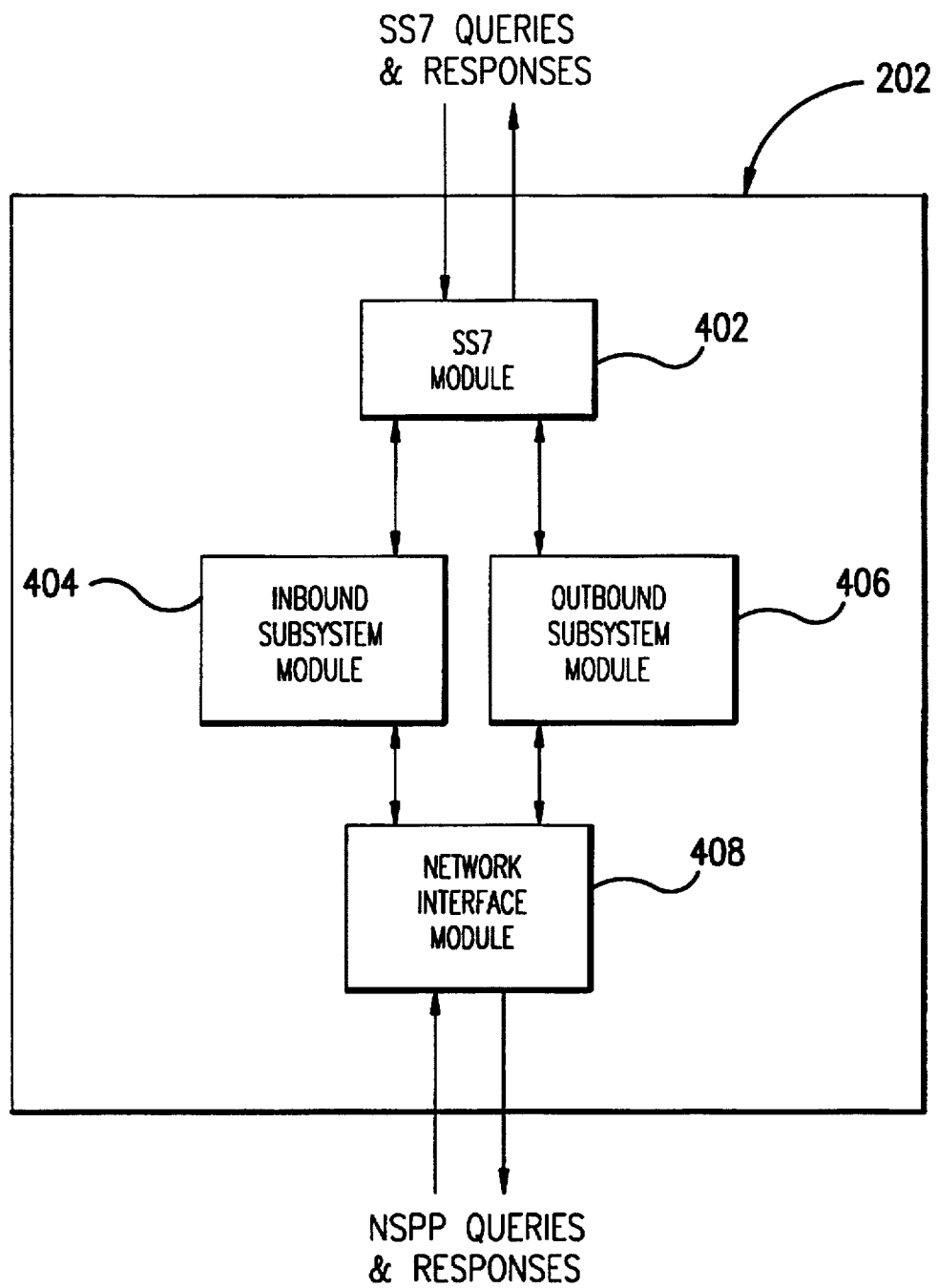
FIG. 4 illustrates a high level block diagram of the Communication Gateway.

A preferred embodiment of the present invention is illustrated in FIG. 4. The Communication G/W 202 is comprised of a SS7 Module 402, such as a DEC SS7 Processor, an Inbound Subsystem Module 404, an Outbound Subsystem 406, and a Network Interface Module 408. The SS7 Module 402 accepts and returns SS7 queries/responses from the SS7 network. Upon receipt of an SS7 query/response, the SS7 Module 402 determines whether to send the query/response to the Inbound 404 or Outbound 406 Subsystem Modules. The Inbound Subsystem Module 404 is used to process inbound queries from one of the many service providers with which the end-user or service provider has agreements. The Outbound Subsystem Module 406 is used to process outbound queries destined for one of the many different service providers with which the end-user or service provider has agreements. The query/response is stripped of the SS7 MTP and SCCP layers and the component part of the TCAP message is sent to the determined Subsystem Module (404 or 406).

The actual protocol translation is performed in both the Inbound Subsystem Module 404 and the Outbound Subsystem Module 406. The Inbound Subsystem Module 404 handles all inbound service requests. The Outbound Subsystem Module 406 handles all outbound service requests.

The last module is a Network Interface Module (NIM) 408. NIM 408 is the interface for both client 118 and server 120 operations between the Communication G/W and the service provider console, such as the ONC 112. NIM 408 routes messages to the console by attaching the UDP-IP layer onto the non-SS7 protocol message. The non-SS7 protocol message is passed to the console over Ethernet. Upon receiving a non-SS7 protocol response from the console, NIM 408 strips the UDP-IP layer from the non-SS7 protocol response and routes the data portion of the message to the appropriate Subsystem Module (404 or 406).

Figure 5A:
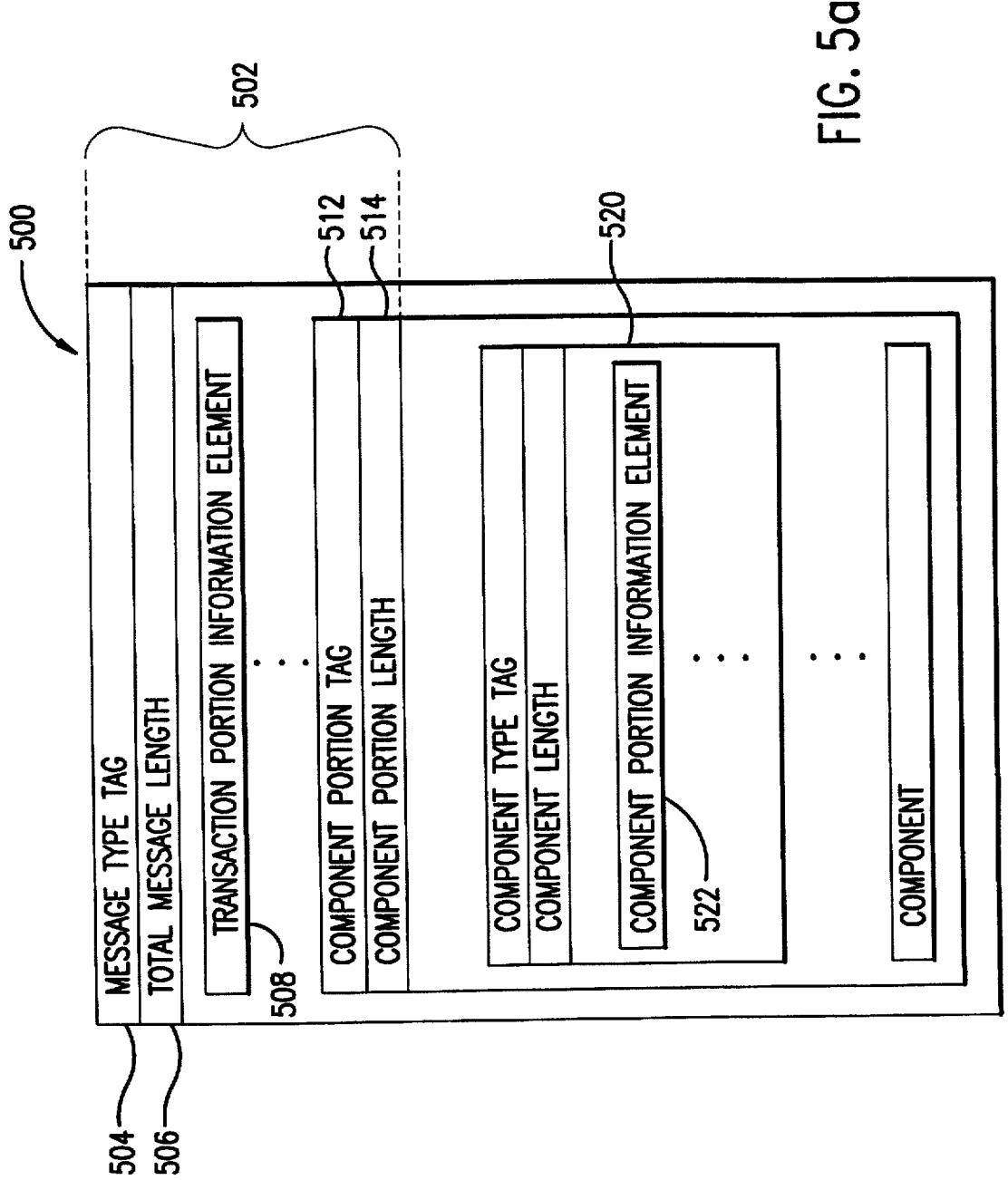

Prior to describing each module (402–408) in detail, a description of the structure of a well known TCAP message 500 is needed to better understand how the TCAP message is handled in the SS7 Module 402 and the Inbound and Outbound Subsystem Modules 404 and 406 of the Communication G/W 202. The structure of the TCAP message 500 is shown in FIG. 5a. The TCAP message 500 consists of a Transaction Portion 502 and a Component Portion 520. The Transaction Portion 510 contains: a message type tag 504, a total TCAP message length 506, a transaction portion information element 508 which contains a transaction ID identifier and a transaction ID length (both not shown), a component portion tag 512, and a component portion length 514.

The message type tag 504 indicates the type of transaction. Three message types are used by the Communication G/W 202: begin, end, and unidirectional. Message type begin indicates the beginning of a transaction and requires that a response be returned. Message type end indicates a response to a query and the end of the transaction. A unidirectional message type indicates a message that does not require a response. The total TCAP message length 506 indicates the total length of the TCAP message.

The Transaction Portion Information Element 508 is comprised of a Transaction ID and a Transaction ID Length. Transaction IDs are assigned to a TCAP message to permit transaction association. For a Begin transaction, only the originating transaction ID will be included in the message. For an End transaction, only the Destination Transaction ID will be included in the message. A unidirectional message is not assigned a Transaction ID. The Destination Transaction ID is a reflection of the Originating Transaction ID and has the same length. For Originating Transaction IDs, the ID is assigned by the SS7 Module 402. For Destination Transaction IDs, the ID mirrors the ID received in the Originating Transaction ID.

The Transaction ID Length field indicates the total length in octets used by the Transaction IDs. The value of this length is determined by the length of the Originating and Destination Transaction IDs combined. It may be zero, one or two information elements. Only the Originating Transaction ID is included with a query, and only the Destination Transaction ID is included with a response.

The Component Portion Tag 512 indicates that the component portion of the TCAP message follows. The Component Portion Length 514 indicates the total length of the Component sequence.

The component portion of the TCAP message 520 is shown in FIG. 5b. The component portion of the TCAP message can consist of any one of four different types of components: Invoke 530, Return Result (Last) 550, Return Error 560, and Reject 570. An Invoke Component 530 is a query message type. The remaining three components: Return Result (Last) 550, Return Error 560, and Reject 570, are response message types. Parameters contained in each component consist of both mandatory parameters and optional parameters. Mandatory parameters are designated with an 'M,' while optional parameters are designated with an 'O.'

The Invoke Component 530 mandatory parameters include a component type tag 532, an invoked ID tag 534, and an operation code tag 542. Optional parameters for the Invoke Component 530 are a linked ID tag 538 and a parameters field 546.

The Return Result (Last) Component 550 mandatory parameters include a component type tag 532 and an invoke ID tag 534. Optional parameters for the Return Result (Last) Component are a sequence tag 552, an operation code tag 542, and parameters field 546.

The Return Error Component 560 mandatory parameters include a component type tag 532, an invoke ID tag 534, and an error code tag 562. The only optional parameter for the Return Error Component 560 is a parameters field 546.

The Reject Component 570 mandatory parameters include a component type tag 532, an invoke ID tag 534, and a problem code tag 572. The only optional parameter for the Reject Component 570 is a parameters field 546.

The component type tag 532 and the invoke ID tag 534 are mandatory parameters in each component type (530, 550, 560, and 570). The component type tag 532 indicates the type of component that follows. The component type tag 532 is an octet in length and is followed by a component length 533 that indicates how many additional octets are in this component. The invoke ID tag 534 refers to the invoke component 532. It is followed by an invoke ID length 535, which is one octet in length, and an invoke ID 536. The invoke ID 536 is assigned by either the Inbound Module or the Outbound Module. Invoke IDs 536 are used to distinguish between multiple components within a single transaction.

The operation code tag 542 identifies the operation to be performed as a local operation. The operation code tag 542 is followed by an operation code length 543 and the operation code 544 itself. The operation code length 543 is one octet in length. The operation code 544 identifies the operation to be performed. For example, ICCN card validation operation codes may include, but are not limited by, (1) validate card without call disposition message (CDM) capability, (2) call disposition, and (3) validate card with CDM capability. Each operation may require its own set of parameters. For example, the parameters included in a validate card query may include, but are not limited to, a primary account number, a personal ID number (PIN), call originating administration ID, called number, and calling number. Call disposition parameters may include, but are not limited to, primary account number, call originating administration ID, call disposition code, call start time, call duration, and estimated call charge.

The sequence tag 552 is used when there is more than one parameter in a Component (applicable to all Component types). These additional parameters follow the sequence tag 552. The sequence tag 552 is followed by a sequence length 553 which indicates the total length of the parameters in the Component.

Error codes 564 are assigned values for identification. Error codes 564 follow the error code tag 562 and error code length 563. The error code length 563 is always one octet.

A problem code 574 is generated when a protocol error is discovered in the TCAP message. These codes are returned in the Reject Component 570. Problem codes 574 always follow a problem code tag 572 and a problem code length 573. The problem code 574 consists of one of four problem types: a general problem, an invoke problem, a return result problem, or a return error problem. Each problem type is identified by a unique 8-bit binary code. The problem code length 573 is always one octet.

Parameters 546 are contained in information elements 522 and may be broken into three basic parts: the parameter tag, the parameter length, and the parameter contents. The parameter tag uniquely identifies a particular parameter. The parameter length encodes the length of the particular parameter being described. The parameter contents field further comprises a type of digits field, a nature of number field, an encoding scheme field, a number of digitis field, and the actual data. The type of digits field refers to the calling number or billing number. The nature of number field refers to national or international. The encoding scheme refers to the format of the data, i.e., ASCII, BCD, etc. The number of digits indicates the number of digits in the actual data field. Parameters 546 in the actual data field may include, but are not limited to, primary account number, personal identification number, call originating administration ID (shows which network the user is making the call from), called number, calling number, call disposition code, call start time, call duration, estimated call charge, error code, problem code, and response code.

Figure 6:
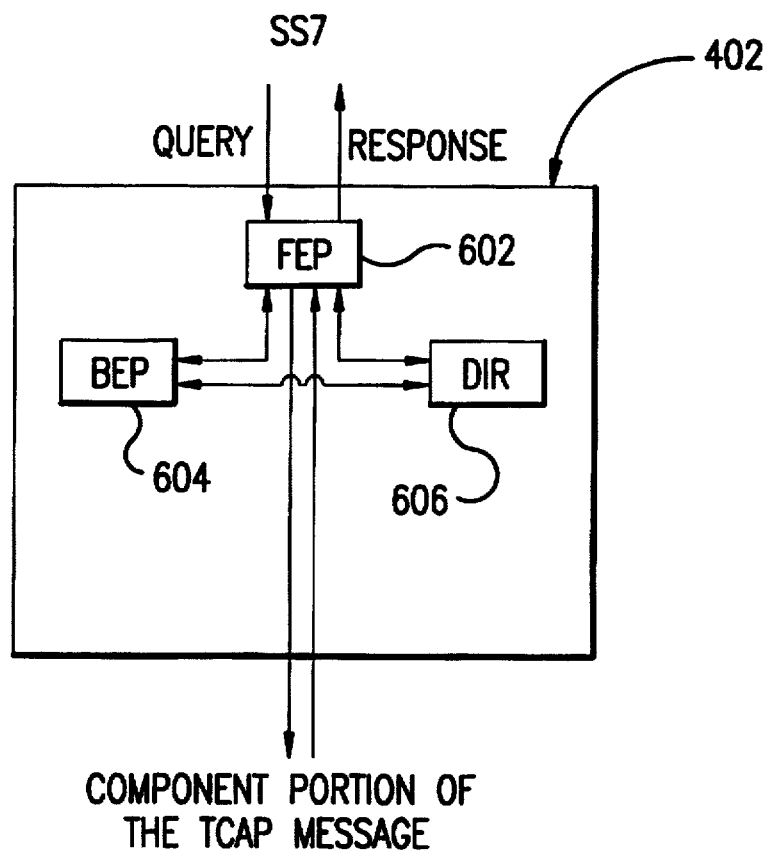
FIG. 6 illustrates a detailed block diagram of the SS7 Module.

The SS7 Module 402 is further defined in FIG. 6. The SS7 Module 402 comprises a front end processor (FEP) 602, a back end processor (BEP) 604, and a DIR 606. SS7 queries/responses are received by the Communication G/W 202 at the SS7 FEP 602. The FEP 602 manages multiple signaling links over which it sends and receives outgoing and incoming messages. The FEP 602 also provides all of the SS7 MTP and SCCP functionality and the Transaction Portion of the TCAP functionality. For incoming messages, the FEP 602 removes the SS7 MTP and SCCP layers from the message, leaving the Transaction Capabilities Application Part (TCAP) 500. The SS7 Module 402 identifies the Subsystem (404 or 406) that the TCAP message is destined for, and parses the Transaction portion of the message 502. Once the message has been successfully parsed, the Component Part of the TCAP message 520 is passed directly to one of the Subsystems (404 or 406), depending upon whether the TCAP message 520 is an inbound or outbound message.

For outgoing messages, the FEP 602 attaches the Transaction Portion of the TCAP message 502 to the Component Portion of the TCAP message 520 and completes the SS7 formatting by attaching the SS7 MTP and SCCP layers to the TCAP message 500 and routes the message out of the Communication G/W 202. The BEP 604 uses the information from the FEP 602 to manage a section of global memory accessed by Subsystems 404 and 406.

The Director Application (DIR) 606 is a SS7 management process. The DIR 606 manages the configuration of the FEP 602 and the BEP 604 and reports events from the FEP 602 and the BEP 604 to a Human Machine Interface (HMI), such as a console, personal computer, or workstation, to display them.

Figure 7:
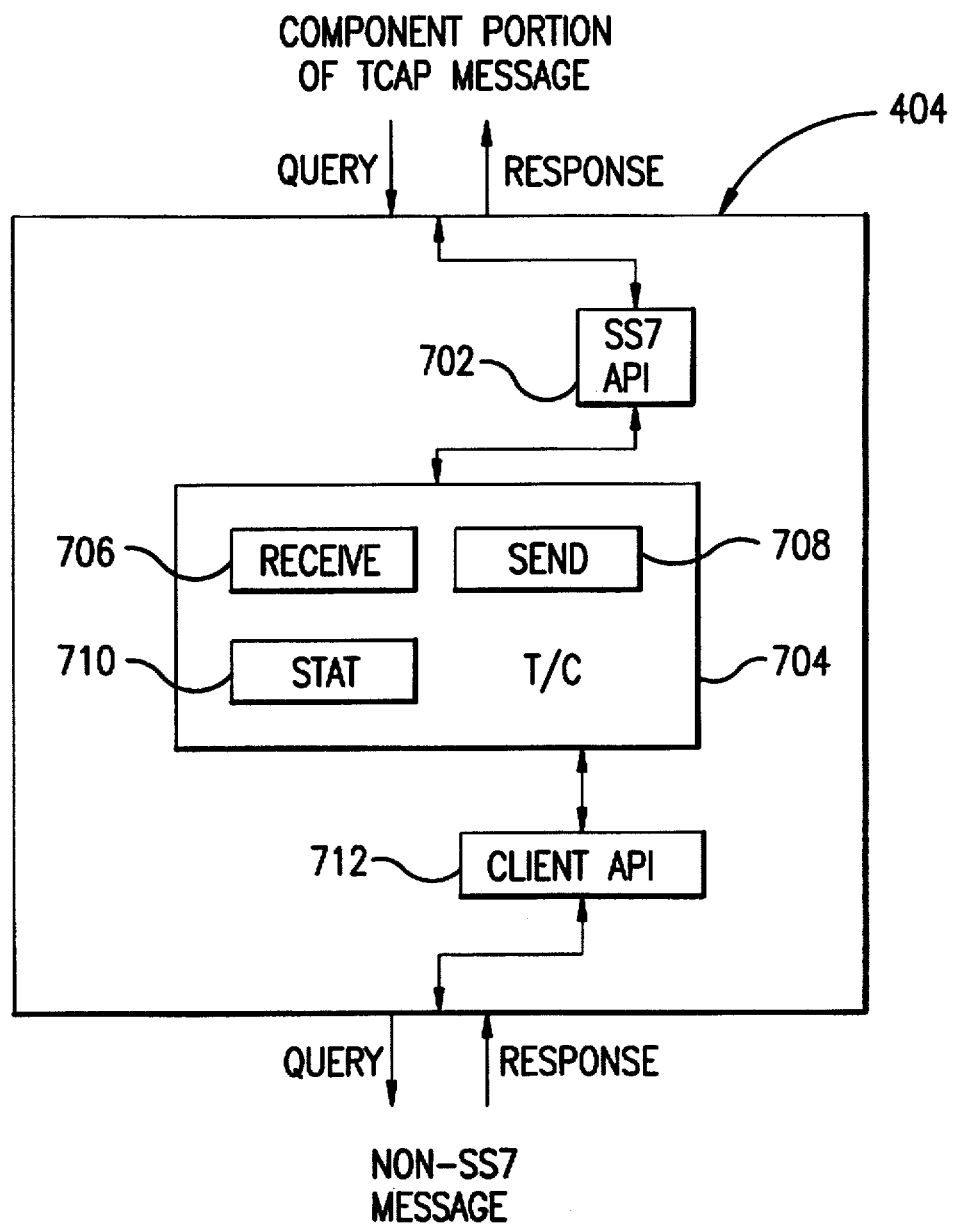
FIG. 7 illustrates a detailed block diagram of the Inbound Module.

The Inbound Subsystem 404 is used to process inbound TCAP queries. A detailed diagram of the Inbound Subsystem 404 is shown in FIG. 7. The Inbound Subsystem 404 comprises a SS7 Application Programming Interface (API) 702, a Translator/Converter (T/C) 704 and a Client API 712. The SS7 API 702 provides the SS7 Module 402 interface routines for interfacing the SS7 Module 402 to the Inbound Subsystem Module 404. It hides all specific initialization and dialog control associated with SS7 from the Inbound Subsystem Module 404. The SS7 API 702 receives the component portion of the TCAP message 520 from the SS7 Module 402 and passes it to the T/C 704. The T/C 704 is divided into three components: T/C Receive 706, T/C Send 708, and T/C Statistics (Stat) 710. T/C Receive 706 parses the entire component portion of the TCAP message 520.

Errors found in the format of the component portion of the TCAP message 520 result in a Reject 570 or Return Error 560 message being returned to the service provider that initiated the SS7 query. Once the TCAP parameters are successfully parsed, T/C Receive 706 translates these parameters into the required format for the console/database servers, such as Network Information Distributed Service (NIDS) database servers 120. The Client API receives responses from the NIM 408, strips off the non-SS7 protocol formatting, and sends the response to T/C Send 708. Upon receipt of a response from the Client API 712, T/C Send 708 builds the component portion of the TCAP message 520 from the response. The message 520 is then sent to the SS7 Module 402 via the SS7 API 702. T/C Stat 710 maintains TCAP statistics and logs them periodically. T/C Stat 710 also interfaces to the HMI to display live statistics.

Figure 8:
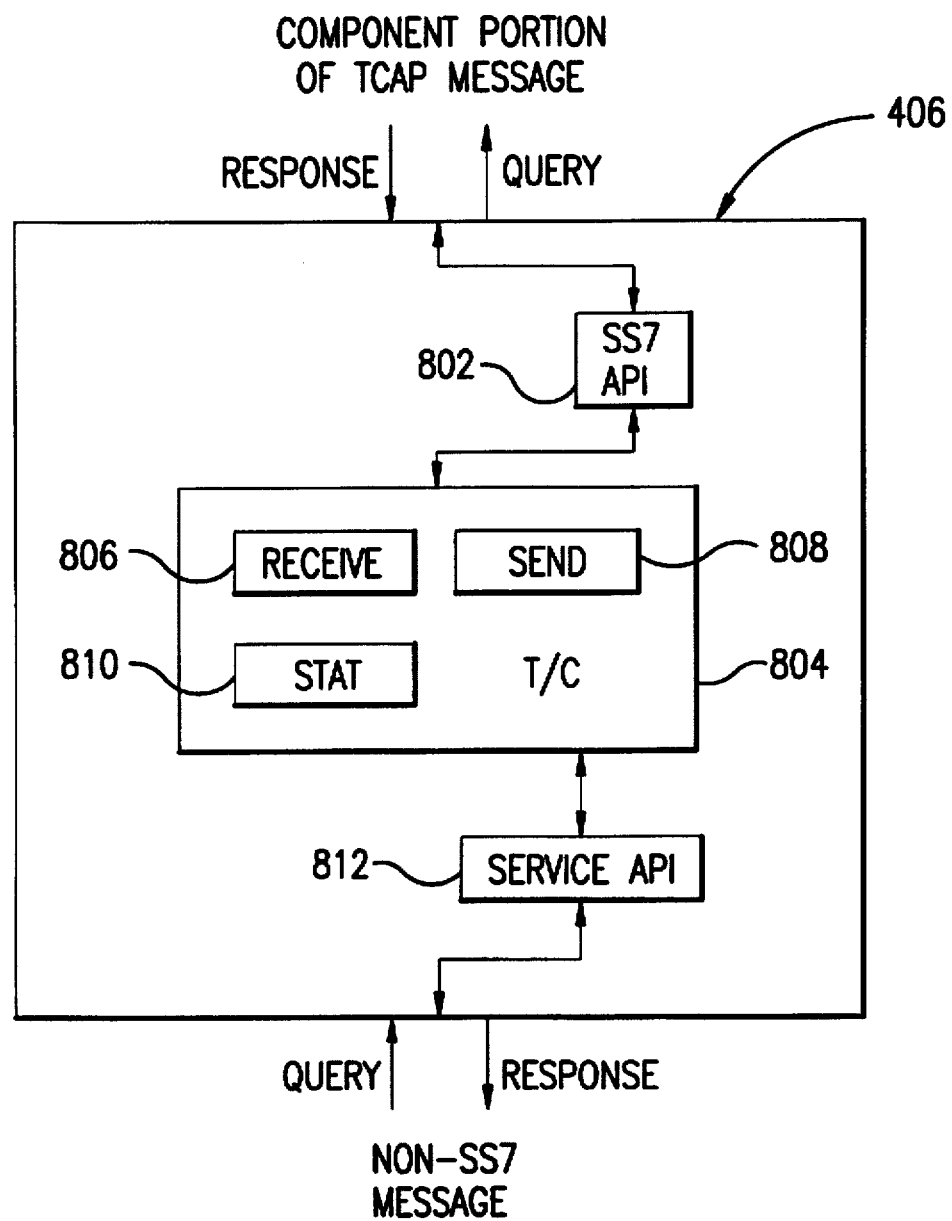
FIG. 8 illustrates a detailed block diagram of the Outbound Module.

The Outbound Subsystem 406 is used to process outbound queries destined for one of the many different service providers with which the end user (service provider) has agreements. A detailed diagram of the Outbound Subsystem 406 is shown in FIG. 8. The Outbound Subsystem 406 comprises a SS7 Application Programming Interface (API) 802, a Translator/Converter (T/C) 804 and a Service API 812. The Service API 812 receives the query from NIM 408. The Service API 812 strips the non-SS7 protocol formatting and forwards the query to the T/C 804. The T/C 804 is divided into three components: T/C Receive 806, T/C Send 808, and T/C Statistics (Stat) 810. T/C Send 808 receives parameters from the Service API 812. Upon receipt of a message from the Service API 812, a TCAP query is built and passed to the SS7 API 802. The SS7 API 802 passes the TCAP message 520 to the SS7 Module 402. The T/C Receive 806 decodes the component portion of the TCAP response 520 that is sent by the service provider responding to the query. The T/C Receive 806 component parses the Component Portion of the TCAP message 520 for errors, translates the parameters into the required format for the database servers, and sends this translated message to the NIM 408. T/C Stat 810 maintains TCAP statistics and logs them periodically. T/C Stat 810 also interfaces to the HMI to display live statistics.

Figure 9A:
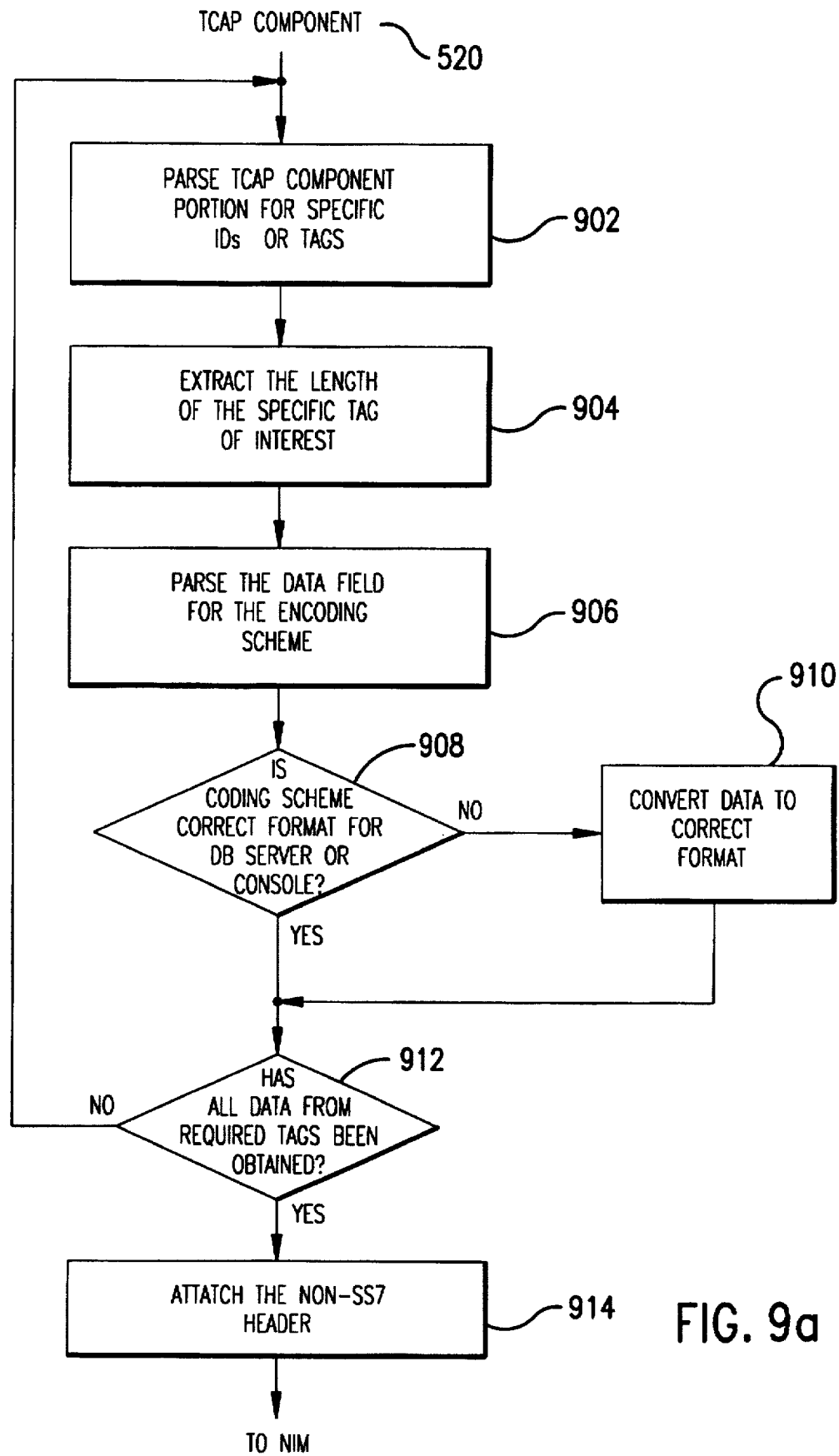
FIGS. 9a and 9b illustrate flow diagrams of the translation between SS7 and NSPP.
Figure 9B:
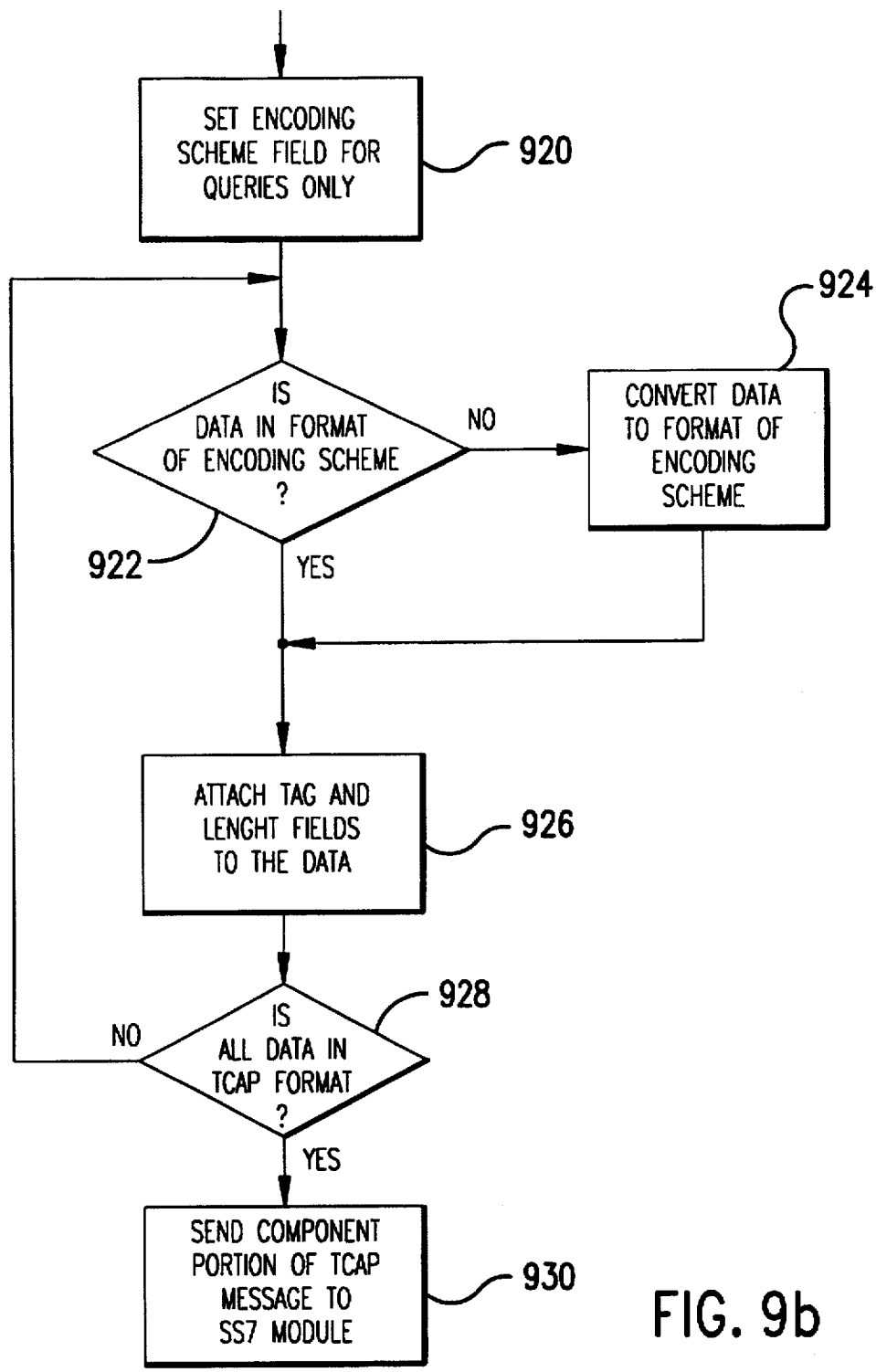

The method used to translate between the SS7 protocol and a non-SS7 protocol, such as NSPP and TCP is shown in FIG. 9a and 9b. As explained above, the TCAP Component portion 520 is usually sent in ANS1 notation, i.e., an identifier or tag, a length field, and a parameter or data field. Certain tags are relevant to certain operations. When the Component Portion of the TCAP message 520 is received by one of the Subsystems 404 or 406, it is parsed or searched for the tags that relate to the operation to be performed in step 902. Once that tag is found, the next field identifies the length. In step 904, the length is extracted from the length field. This length is used to extract the correct number of digits from the parameter contents of the message. The data field is parsed to obtain the encoding scheme of the data in step 906. The service provider console/database (DB) server in which the data is being sent may want to see the data in a specific format, such as fixed length ASCII format. In step 908, the encoding scheme is examined to determine the data format. If the data is not in the format required by the encoding scheme, such as fixed length ASCII format, then in step 910 the data is converted to the format designated by the encoding scheme. Steps 902 through 910 are repeated until all the data from each of the required tags has been extracted (step 912). In step 914, a non-SS7 protocol header, such as a NSPP header or a TCP header, is attached and the data is passed to the NIM 408. The non-SS7 header includes message sequencing information and service destination information.

Referring now to FIG. 9b, data that is received by the two Subsystems 404 and 406 from NIM 408 is built into a TCAP message. If the data is a query (referring to an Outbound process), the encoding scheme is set and the data must be supplied in the format that matches that encoding scheme (step 920). The encoding scheme of the corresponding data is examined in step 922. If the encoding scheme is a different format, the data is converted to the format expected by the TCAP message (step 924). In step 926, a length and tag field are attached to the data portion of the message to reconfigure the TCAP Component portion 520. Steps 922 through 928 are repeated until all data has been assigned a corresponding tag and length field. In step 930, the TCAP message 520 is passed to the SS7 Module 402.

Referring back to FIG. 4, NIM 408 is responsible for routing messages to and from the service provider console. NIM 408 also provides the functionality required to implement both the client 118 and server 120 operations of the non-SS7 protocol as well as supporting both IPX and IP based routing. Both IPX and IP are well known protocols to persons skilled in the relevant art(s). The client portion 118 of NIM 408 provides all functions currently available on the Communication G/W 202. This includes load sharing, simultaneous server access, multiple applications sharing one client, and a number of other features unique to the Communication G/W client 118. The server portion 120 of NIM 408 provides all functions required to service external client requests. The system supports up to 4,096 operator console clients attaching to NIM 408. It provides the functions needed to handle session requests, connection control, flow control, message routing, and session closing. NIM 408 also attaches and detaches the UDP-IP layer to and from the non-SS7 protocol message when it sends and receives non-SS7 protocol messages to and from the console.

Figure 10:
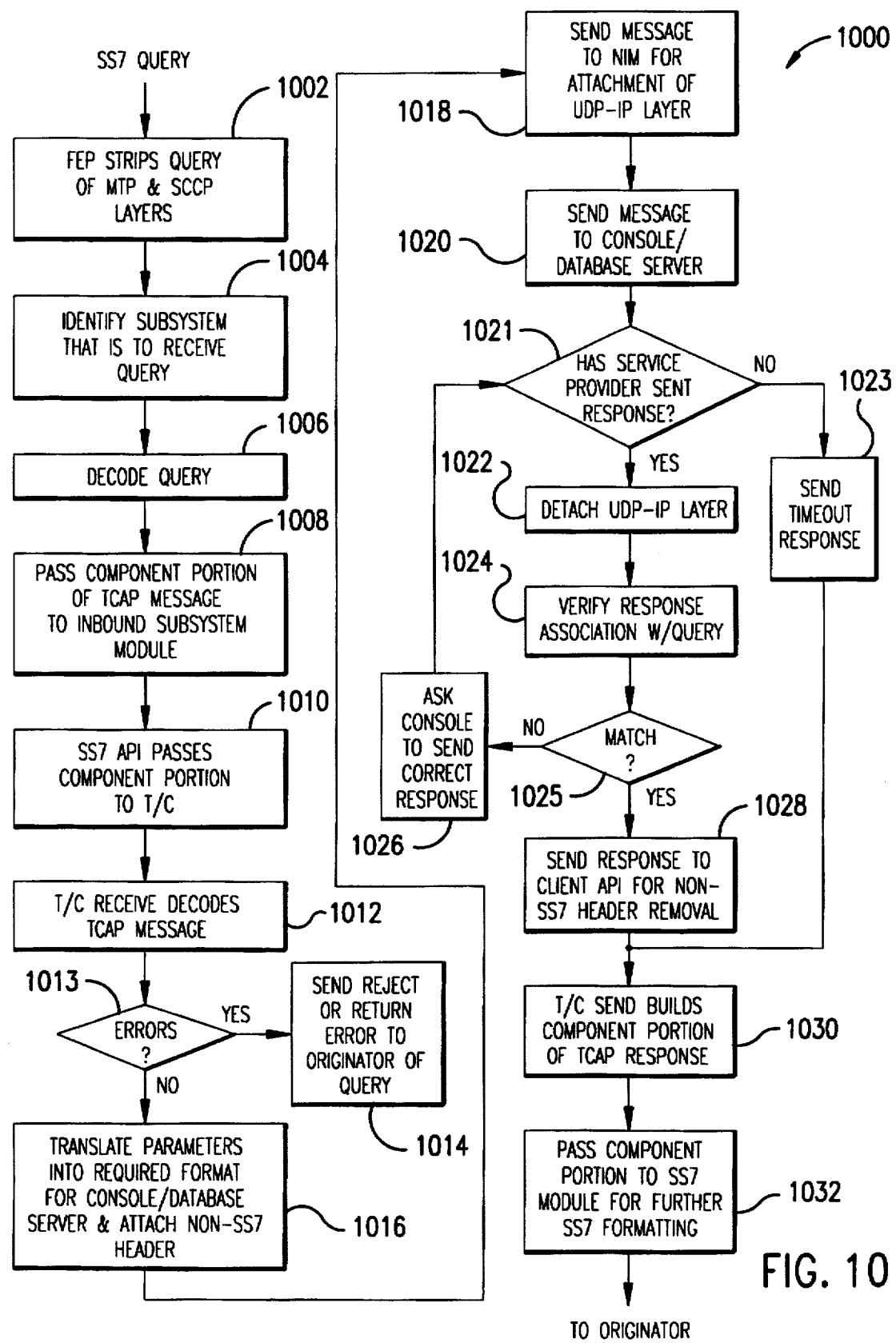
FIG. 10 illustrates a flow diagram of an inbound process.
Figure 11:
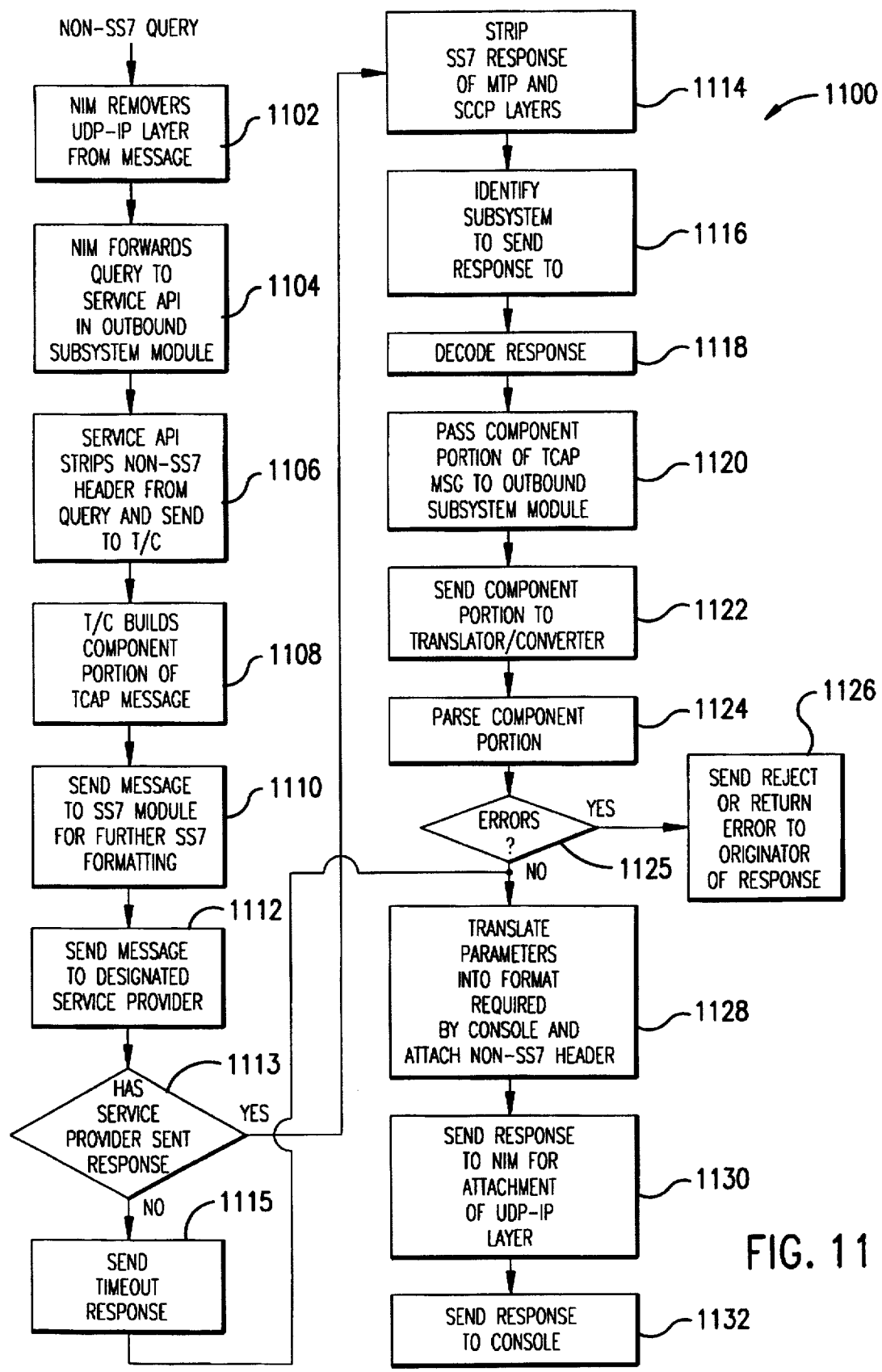
FIG. 11 illustrates a flow diagram of an outbound process.

The Inbound process is designed to provide international inbound SS7 TCAP validation capabilities on the Communication G/W 202. The Outbound process is designed to provide outbound SS7 TCAP validation capabilities on the Communication G/W 202. FIGS. 10 and 11 illustrate flow diagrams of the Inbound process 1000 and the Outbound process 1100. Both processes 1000 and 1100 are described in terms of ICCN card validation for example purposes only and are not meant to limit the scope of the present invention. As previously stated, the present invention can be used for other types of validation services as well as database service, switch service, and audio service.

The Inbound process 1000 handles inbound domestic queries. Inbound queries are initiated when a service provider customer places a telephone call from a foreign country, and the foreign PTT 110 needs to validate the ICCN card number. The inbound process 1000 performs validation on the query. The SS7 query enters the SS7 Module 402 at step 1002. In step 1002, the FEP 602 strips the SS7 MTP and SCCP layers from the query. Next, the process 1000 identifies the Subsystem (404 or 406) that the TCAP message is to be sent (step 1004). The query is decoded in step 1006 to separate the Transaction Portion of the TCAP message 502 from the Component Portion of the TCAP message 520. In step 1008, the Component Portion of the TCAP message 520 passes to the Inbound Subsystem Module 404. The BEP 604 uses the information from the FEP 602 to manage a section of global memory accessed by the Inbound and Outbound Subsystem Modules (404 and 406). The SS7 API 702 receives the Component Portion of the TCAP message 520 and passes it to the Translator/Converter 704 in step 1010. T/C Receive 706 decodes or parses the entire TCAP message 520 (step 1012). Errors found (in step 1013) in the format of the TCAP message 520 result in a Reject 570 or a Return Error 560 being returned to the foreign PTT 110 that originated the query (step 1014). Once the TCAP parameters are successfully parsed, TIC Receive 706, in step 1016, translates the desired parameters into the required format for the database servers 120 and attaches the non-SS7 protocol header to the message as described in FIG. 9a. In step 1018, the message is sent to the NIM 408 where the UDP-IP layer is attached to the message. The message passes over the Ethernet to the database server in step 1020 for ICCN validation. In step 1021, it is determined whether the service provider has sent a response. If the service provider has not sent a response, a timeout response is sent (step 1023) to T/C Send 708 in step 1030 where the Component Portion of the TCAP response 520 is built as described in FIG. 9b. Referring back to step 1021, if a response is sent back to NIM 408 over the Ethernet, NIM 408, upon receiving the response, detaches the UDP-IP layer from the response (step 1022) and verifies that the response is associated with the right query by examining the sequence field of the non-SS7 protocol header (step 1024). If the response is not a match (determined in step 1025), in step 1026 NIM 408 informs the database server that an incorrect response is received and another response is sent. Steps 1022 through 1026 are repeated until the correct response is received. In step 1028, the response is sent to the Inbound Subsystem Module 404 where the non-SS7 protocol header is removed by the Client API 712. The data portion of the message is sent to T/C Send 708 in step 1030 where the Component Portion of the TCAP response 520 is built as described in FIG. 9b. The Component Portion of the TCAP response 520 is passed to the SS7 Module 402 for further SS7 formatting, i.e., adding the Transaction Portion of the TCAP message 502 as well as the SS7 SCCP and MTP layers (step 1032). The Inbound process 1000 ends with the routing of the response back to the foreign PTT 110.

FIG. 11 illustrates a flow diagram of the Outbound process 1100. Outbound queries are initiated when the console receives a call for which the customer is using a calling card other than one issued by the service provider, and the calling card number needs to be validated. A validation query is routed to the Communication G/W 202 via Ethernet. In step 1102, NIM 408 receives the query and removes the UDP-IP layer from the message. NIM 408 recognizes the non-SS7 protocol packet as destined for the Outbound Subsystem Module 406 and forwards the query to the Service API 812 in step 1104. The Service API 812, in step 1106, strips the non-SS7 protocol header from the query and forwards the query to the T/C 804. T/C Send 808 builds the Component Portion of the TCAP message 520 in step 1108, as described in FIG. 9b. In step 1110, the message is sent to the SS7 Module 402 where the completion of the SS7 formatting occurs by attaching the Transaction Portion of the TCAP message 502 to the Component Portion of the TCAP message 520 and adding both the SS7 SCCP and MTP layers to the message. The message is sent to the designated service provider over the SS7 network in step 1112.

In step 1113, it is determined whether the service provider has sent a response. If a response has not been sent, a timeout response is sent in step 1115 and the T/C Receive 806, in step 1128, translates the desired parameters into the required format for the database servers 120 and attaches the non-SS7 protocol header to the message as described in FIG. 9a. Referring back to step 1113, if a SS7 response is sent back to the Communication G/W 202, the SS7 response enters the SS7 Module 402 at step 1114. In step 1114, the FEP 602 strips the SS7 MTP and SCCP layers from the response.

Identification of the Outbound Subsystem Module as being the module in which the response is to be sent is determined in step 1116. The response is decoded in step 1118 to separate the Transaction Portion of the TCAP message 502 from the Component Portion of the TCAP message 520. In step 1120, the Component Portion of the TCAP message 520 passes to the Outbound Subsystem Module 406.

The SS7 API 802 receives the Component Portion of the TCAP message 520 and passes it to the Translator/Converter 804 in step 1122. T/C Receive 806 parses the entire TCAP message 520 (step 1124). Errors found in the format of the TCAP message 520 result in a Reject 570 or a Return Error 560 being returned to the foreign PTT 110 from which the response was sent (step 1126). Once the TCAP parameters are successfully parsed, T/C Receive 806, in step 1128, translates the desired parameters into the required format for the database servers 120 and attaches the non-SS7 protocol header to the message as described in FIG. 9a. In step 1130, the response is sent to the NIM 408 where the UDP-IP layer is attached to the message. The response passes over the Ethernet to the console in step 1132.

While embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A communication gateway for protocol translation, comprising:

a Signaling System No. 7 (SS7) Module for receiving a plurality of incoming SS7 queries and sending a plurality of responses corresponding to said incoming SS7 queries, comprising:

a front end processor (FEP) for stripping a SS7 Message Transfer Part (MTP) layer and a SS7 Signaling Connection Control Part (SCCP) layer from each of said incoming SS7 queries to thereby obtain a SS7 Transaction Capabilities Application Part (TCAP) message, for parsing said SS7 TCAP message into a Transaction portion and a Component portion, for attaching said Transaction portion to said Component portion to thereby obtain said SS7 TCAP message for each of said responses corresponding to said incoming SS7 queries, and for attaching said SS7 MTP layer and said SS7 SCCP layer to said responses; and an Inbound Subsystem Module, coupled to said SS7 Module, for translating said incoming SS7 queries from a SS7 protocol to a non-SS7 protocol, said translated incoming SS7 queries being forwarded to an end user while in said non-SS7 protocol, and for translating said responses corresponding to said incoming SS7 queries from said non-SS7 protocol to said SS7 protocol.

2. The communication gateway of claim 1, wherein said non-SS7 protocol is a Network Information Distribution Service (NIDS) Sequenced Packet Protocol (NSPP) protocol.

3. The communication gateway of claim 1, wherein said Inbound Subsystem Module translates said Component portion from said SS7 protocol to said non-SS7 protocol, and translates said non-SS7 protocol into said Component portion of said SS7 protocol.

4. The communication gateway of claim 1, further comprising:

an Outbound Subsystem Module, coupled to said SS7 Module, for translating a plurality of outgoing SS7 queries from said non-SS7 protocol to said SS7 protocol, said translated outgoing queries being sent via said SS7 Module across an SS7 network, and for translating a plurality of SS7 responses corresponding to said outgoing SS7 queries from said SS7 protocol to said non-SS7 protocol, said translated responses corresponding to said outgoing SS7 queries being forwarded to an end user while in said non-SS7 protocol.

5. The communication gateway of claim 4, further comprising:

a network interface module (NIM), coupled to said Inbound Subsystem Module and said Outbound Subsystem Module, for interfacing with end users.

6. The communication gateway of claim 5, wherein said Inbound Subsystem Module comprises:

a SS7 Application Programming Interface (API) for interfacing said SS7 Module to said Inbound Subsystem Module;

a client API for interfacing said Inbound Subsystem Module to said NIM; and a Translator/Converter (T/C), wherein said T/C comprises:

a T/C receive component for error checking said Component portion, for parsing said Component portion in search of a tag field identifier, for converting a plurality of parameters associated with said tag field identifier into a data format required by said end user, if necessary, and for attaching a non-SS7 header to said parameters; and a T/C send component for converting a plurality of parameters from said response corresponding to said incoming SS7 queries into a data format required by the SS7 network, if necessary, and for attaching a length field identifier, designating the length of said parameters, and said tag field identifier to said parameters to thereby obtain said Component portion.

7. A communication gateway for protocol translation, comprising:

an Outbound Subsystem Module for translating a plurality of outgoing Signaling System No. 7 (SS7) queries from a non-SS7 protocol to a SS7 protocol, and for translating a plurality of SS7 responses corresponding to said outgoing SS7 queries from said SS7 protocol to said non-SS7 protocol, said translated responses corresponding to said outgoing SS7 queries being forwarded to an end user while in said non-SS7 protocol; and an SS7 Module, coupled to said Outbound Subsystem Module, for forwarding said translated outgoing SS7 queries to a SS7 network, and receiving said SS7 responses corresponding to said outgoing SS7 queries, comprising:

a front end processor (FEP) for attaching a Transaction portion to said Component portion to thereby obtain a SS7 Transaction Capabilities Application Part (TCAP) message, for attaching a SS7 Message Transfer Part (MTP) layer and a SS7 Signaling Connection Control Part (SCCP) layer to said SS7 TCAP message to thereby obtain an SS7 query, for stripping said SS7 MTP layer and said SS7 SCCP layer from said SS7 responses corresponding to said outgoing SS7 queries to thereby obtain a SS7 TCAP message, and for parsing said SS7 TCAP message into a Transaction portion and a Component portion.

8. The communication gateway of claim 7, wherein said Outbound Subsystem Module comprises:

a service Application Programming Interface (API) for interfacing said Outbound Subsystem Module to said end user via a network interface module (NIM);

a SS7 Application Programming Interface (API) for interfacing said SS7 Module to said Outbound Subsystem Module; and a Translator/Converter (T/C), wherein said T/C comprises:

a T/C send component for converting a plurality of parameters from said non-SS7 query into a data format required by said SS7 network, if necessary, and for attaching a length field identifier, designating the length of said parameters, and a tag field identifier to said parameters to thereby obtain a Component portion of a SS7 Transaction Capabilities Application Part (TCAP) message; and a T/C receive component for error checking said Component portion of a SS7 TCAP responses corresponding to said outgoing SS7 queries, for parsing said Component portion in search of a tag field identifier, for converting a plurality of parameters associated with said tag field identifier into a data format required by said end user, if necessary, and for attaching a non-SS7 header to said parameters.

9. The gateway of claim 7, wherein said Outbound Subsystem Module translates said non-SS7 protocol into said Component portion of said SS7 protocol, and translates said Component portion from said SS7 protocol to said non-SS7 protocol.

10. A method for protocol translation, comprising the steps of:

(1) receiving a plurality of incoming Signaling System No. 7 (SS7) queries;

(2) translating said incoming SS7 queries from a SS7 protocol to a non-SS7 protocol, comprising the step of stripping a SS7 Message Transfer Part (MTP) layer and a SS7 Signaling Connection Control Part (SCCP) layer from each of said incoming SS7 queries to obtain a SS7 Transaction Capabilities Application Part (TCAP) message;

(3) forwarding said translated incoming queries to an end user while in said non-SS7 protocol;

(4) translating a plurality of responses corresponding to said incoming SS7 queries from said non-SS7 protocol to said SS7 protocol; and (5) sending said responses corresponding to said incoming SS7 queries over a SS7 network.

11. The method of claim 10, wherein step (2) further comprises the steps of:

(a) parsing said SS7 TCAP message into a Transaction portion and a Component portion;

(b) checking said Component portion for errors;

(c) parsing said Component portion in search of a tag field identifier that relates to an operation to be performed;

(d) converting a plurality of parameters associated with said tag field identifier into a data format required by said end user, if necessary;

(e) repeating steps (c) and (d) until all of said parameters in each of said tag field identifiers needed to perform said operation is obtained; and (f) attaching a non-SS7 header to said parameters.

12. The method of claim 10, wherein step (4) comprises the steps of:

(a) converting a plurality of parameters from each of said responses corresponding to said incoming SS7 queries into a data format required by the SS7 network, if necessary;

(b) attaching a length field identifier, designating the length of said parameters, and a tag field identifier to said parameters to thereby obtain a Component portion of a SS7 TCAP message;

(c) attaching a Transaction portion to said Component portion to thereby obtain said SS7 TCAP message for each of said responses; and (d) attaching a SS7 MTP layer and a SS7 SCCP layer to said SS7 TCAP message.

13. A method for protocol translation, comprising the steps of:

(1) translating outgoing Signaling System No. 7 (SS7) queries from a non-SS7 protocol to a SS7 protocol, comprising the step of attaching a SS7 Message Transfer Part (MTP) layer and a SS7 Signaling Connection Control Part (SCCP) layer to a SS7 Transaction Capabilities Application Part (TCAP) message to thereby obtain said outgoing SS7 queries;

(2) forwarding said translated SS7 queries to a SS7 network;

(3) translating SS7 responses corresponding to said forwarded SS7 queries from said SS7 protocol to said non-SS7 protocol; and (4) forwarding said translated SS7 responses corresponding to said forwarded SS7 queries to an end user while in said non-SS7 protocol.

14. The method of claim 13, wherein step (1) comprises the steps of:

(a) converting a plurality of parameters from a non-SS7 query into a data format required by said SS7 network, if necessary;

(b) attaching a length field identifier, designating the length of said parameters, and a tag field identifier to said parameters to thereby obtain a Component portion of a SS7 TCAP message; and (c) attaching a Transaction portion to said Component portion to thereby obtain a SS7 TCAP message.

15. The method of claim 13, wherein step (3) comprises the steps of:

(a) stripping a SS7 MTP layer and a SS7 SCCP layer from said SS7 responses corresponding to said outgoing SS7 queries to thereby obtain a SS7 TCAP message;

(b) parsing said SS7 TCAP message into a Transaction portion and a Component portion;

(c) checking said Component portion for errors;

(d) parsing said Component portion in search of a tag field identifier that relates to an operation to be performed;

(e) converting a plurality of parameters associated with said tag field identifier into a data format required by said end user, if necessary;

(f) repeating steps (d) and (e) until all of said parameters in each of said tag field identifiers needed to perform said operation is obtained; and (g) attaching a non-SS7 header to said parameters.

16. The communication gateway of claim 6, wherein said communication gateway further comprises:

means for communicating with a plurality of foreign Postal Telephone and Telegraphs (PTTs);

means for monitoring said communication gateway; wherein monitoring means includes means for generating an alarm when an error is detected; and means for managing all processes on said communication gateway;

wherein managing means includes means for invoking policies for deciding which of said processes will be activated through the initialization and de-initialization of said process.

17. The communication gateway of claim 7, further comprising:

an Inbound Subsystem Module, coupled to said SS7 Module, for translating a plurality of incoming SS7 queries from a SS7 protocol to a non-SS7 protocol, said translated incoming SS7 queries being forwarded to an end user while in said non-SS7 protocol, and for translating a plurality of responses corresponding to said incoming SS7 queries from said non-SS7 protocol to said SS7 protocol.

18. The communication gateway of claim 17, further comprising:

a network interface module (NIM), coupled to said Outbound Subsystem Module and said Inbound Subsystem Module, for interfacing with end users.

19. The communication gateway of claim 7, wherein said Outbound Subsystem Module comprises:

a service Application Programming Interface (API) for interfacing said Outbound Subsystem Module to said end user via a network interface module (NIM);

a SS7 Application Programming Interface (API) for interfacing said SS7 Module to said Outbound Subsystem Module; and a Translator/Converter (T/C), wherein said T/C comprises:

a T/C send component for converting a plurality of parameters from said non-SS7 query into a data format required by said SS7 network, if necessary, and for attaching a length field identifier, designating the length of said parameters, and a tag field identifier to said parameters to thereby obtain a Component portion of a SS7 Transaction Capabilities Application Part (TCAP) message; and a T/C receive component for error checking said Component portion of a SS7 TCAP responses corresponding to said outgoing SS7 queries, for parsing said Component portion in search of a tag field identifier, for converting a plurality of parameters associated with said tag field identifier into a data format required by said end user, if necessary, and for attaching a non-SS7 header to said parameters.

20. The communication gateway of claim 17, wherein said Inbound Subsystem Module comprises:

a SS7 Application Programming Interface (API) for interfacing said SS7 Module to said Inbound Subsystem Module;

a client API for interfacing said Inbound Subsystem Module to said NIM; and a Translator/Converter (T/C), wherein said T/C comprises:

a T/C receive component for error checking said Component portion, for parsing said Component portion in search of a tag field identifier, for converting a plurality of parameters associated with said tag field identifier into a data format required by said end user, if necessary, and for attaching a non-SS7 header to said parameters; and a T/C send component for converting a plurality of parameters from said response corresponding to said incoming SS7 queries into a data format required by the SS7 network, if necessary, and for attaching a length field identifier, designating the length of said parameters, and said tag field identifier to said parameters to thereby obtain said Component portion.

* * * * *